US012630176B2

(12) United States Patent
Minoura et al.

(10) Patent No.: US 12,630,176 B2
(45) Date of Patent: May 19, 2026

(54) INFORMATION PROCESSING DEVICE, VEHICLE, AND STORAGE MEDIUM

(71) Applicant: TOYOTA JIDOSHA KABUSHIKI KAISHA, Toyota (JP)

(72) Inventors: Wataru Minoura, Nagoya (JP); Fumihiro Nasu, Nagoya (JP); Yoshiaki Motoyasu, Nagoya (JP); Yoshiki Terashima, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 322 days.

(21) Appl. No.: 18/456,149

(22) Filed: Aug. 25, 2023

(65) Prior Publication Data

US 2024/0132094 A1    Apr. 25, 2024
US 2024/0227839 A9    Jul. 11, 2024

(30) Foreign Application Priority Data

Oct. 21, 2022    (JP) ................................. 2022-169514

(51) Int. Cl.
B60W 60/00    (2020.01)
B60W 50/14    (2020.01)
G01C 21/34    (2006.01)
G01C 21/36    (2006.01)
B60W 50/00    (2006.01)

(52) U.S. Cl.
CPC ........ B60W 50/14 (2013.01); B60W 60/0057 (2020.02); G01C 21/3492 (2013.01); G01C 21/3694 (2013.01); B60W 2050/007 (2013.01); B60W 2050/146 (2013.01); B60W 2556/40 (2020.02)

(58) Field of Classification Search
CPC ..... B60W 2050/007; B60W 2050/146; B60W 2556/40; B60W 2556/50; B60W 50/14; B60W 60/0057; G01C 21/34; G01C 21/3492; G01C 21/3694; G08G 1/096708; G08G 1/0968
See application file for complete search history.

(56) References Cited

U.S. PATENT DOCUMENTS

2017/0314957 A1*  11/2017  Mimura ............. G01C 21/3697
2018/0314252 A1  11/2018  Asakura et al.
2022/0234625 A1   7/2022  Anabuki et al.

FOREIGN PATENT DOCUMENTS

JP       2015-175824 A     10/2015
JP       2017-198585 A     11/2017
JP       2021148747 A   *   9/2021
WO       2017/006651 A1     1/2017
WO       2021/153382 A1     8/2021

* cited by examiner

*Primary Examiner* — Charles J Han
(74) *Attorney, Agent, or Firm* — OLIFF PLC.

(57) ABSTRACT

The information processing device extracts one or a plurality of autonomously drivable sections in the traveling route of the vehicle to the destination. Further, the information processing device specifies the first section having the longest autonomous driving continuable time on the traveling route. Then, the information processing device outputs the autonomous driving continuable time in the first section.

9 Claims, 6 Drawing Sheets

| | SCHEDULED TRAVELING TIME | TOTAL AUTOMATIC OPERATION TIME | LONGEST DURATION |
|---|---|---|---|
| ROUTE 1 | ○○h○○m | ○○h○○m | ○○h○○m |
| ROUTE 2 | △△h△△m | △△h△△m | △△h△△m |
| ROUTE 3 | ××h××m | ××h××m | ××h××m |

START

TRAFFIC INFORMATION ACQUISITION — S101

EXTRACTION OF AUTONOMOUSLY DRIVABLE SECTION — S102

Te, Tt CALCULATION — S103

1ST SECTION AND TI IDENTIFICATION — S104

DISPLAY SIGNAL TRANSMISSION — S105

END

INFORMATION PROCESSING DEVICE, VEHICLE, AND STORAGE MEDIUM

CROSS-REFERENCE TO RELATED APPLICATION

This application claims priority to Japanese Patent Application No. 2022-169514 filed on Oct. 21, 2022, incorporated herein by reference in its entirety.

BACKGROUND

1. Technical Field

The present disclosure relates to a technique for providing a driver of a vehicle with information on a traveling route to a destination.

2. Description of Related Art

WO 2021/153382 discloses a technique relating to an output of a moving route of a mobile body in which autonomous driving and manual driving are switchable. In WO 2021/153382, a first route and a second route are calculated based on a departure point and a destination of the mobile body and a degree of intervention of an operator of the mobile body in driving the mobile body. The first route is a moving route including a manual section in which a driver is required to drive. The second route is a mobile route that does not include the manual section. The calculated moving route is output in the mobile body.

SUMMARY

An object of the present disclosure is to provide information useful when a driver of a vehicle in which autonomous driving and manual driving are switchable selects a traveling route of the vehicle.

An information processing device according to a first aspect of the present disclosure includes a control unit that executes: extracting one or more autonomously drivable sections in a traveling route of a vehicle to a destination; identifying a first section in which an autonomous driving continuable time is longest in the traveling route; and outputting the autonomous driving continuable time in the first section.

A vehicle according to a second aspect of the present disclosure is a vehicle in which autonomous driving and manual driving are switchable, and includes the information processing device according to the first aspect.

A storage medium according to a third aspect of the present disclosure stores a program that causes a computer to execute processes including: extracting one or more autonomously drivable sections in a traveling route of a vehicle to a destination; identifying a first section in which an autonomous driving continuable time is longest in the traveling route; and outputting the autonomous driving continuable time in the first section.

According to the present disclosure, it is possible to provide information useful when a driver of a vehicle in which autonomous driving and manual driving are switchable selects a traveling route of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram illustrating a schematic configuration of an information providing system according to an embodiment;

FIG. 3 is a diagram illustrating an example of a display of a scheduled traveling time to a destination, a total automatic driving time, and a longest duration in the display;

DETAILED DESCRIPTION OF EMBODIMENTS

Figure 2:
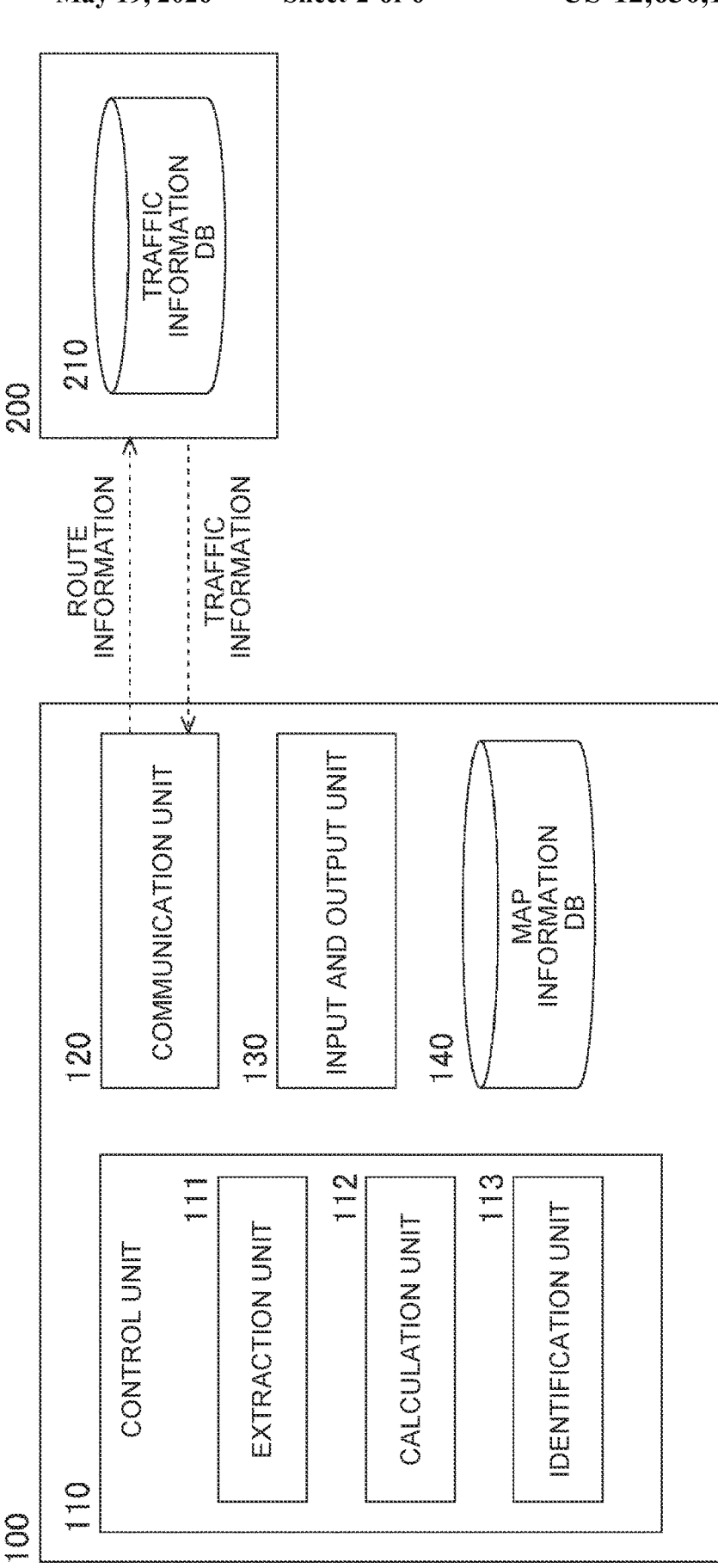
FIG. 2 is a block diagram schematically illustrating an example of a functional configuration of an in-vehicle device.

On a road on which a vehicle capable of switching between automatic driving and manual driving travels, it is assumed that a section capable of automatic driving and a section not capable of automatic driving are set. Here, the section in which the automatic driving is not possible may include not only a section in which the automatic driving is technically impossible but also a section in which the automatic driving is not permitted by laws and regulations. When the vehicle travels in a section where automatic driving can be performed (section where automatic driving can be performed), the driver of the vehicle can select automatic driving. On the other hand, when the vehicle travels in a section where automatic driving is impossible, the driver of the vehicle needs to perform manual driving.

In the information processing device according to the present disclosure, the control unit extracts one or a plurality of autonomous drivable sections in the traveling route of the vehicle to the destination. Further, the control unit specifies, as the first section, a section having the longest autonomous driving continuable time on the traveling route of the vehicle. Here, the autonomous driving continuable time is a scheduled traveling time of the vehicle in the autonomously drivable section. The traveling route of the vehicle may include a plurality of autonomously drivable sections. In this case, the control unit may specify the first section by calculating the scheduled traveling time of the vehicle in each of the autonomous drivable sections.

Then, the control unit outputs the autonomous driving continuable time in the specified first section. As a result, the driver can grasp a time period in which the time period during which the manual driving is not required is the longest when the vehicle travels on the traveling route to the destination. As a result, the driver can select the traveling route of the vehicle on the basis of the time that does not need to perform the manual driving but lasts for the longest time.

Hereinafter, an embodiment of the present disclosure will be described with reference to the drawings. The dimensions, materials, shapes, relative arrangements, and the like of the components described in the present embodiment are not intended to limit the technical scope of the present disclosure to only those unless otherwise specified.

Embodiment

System Overview

Figure 1:
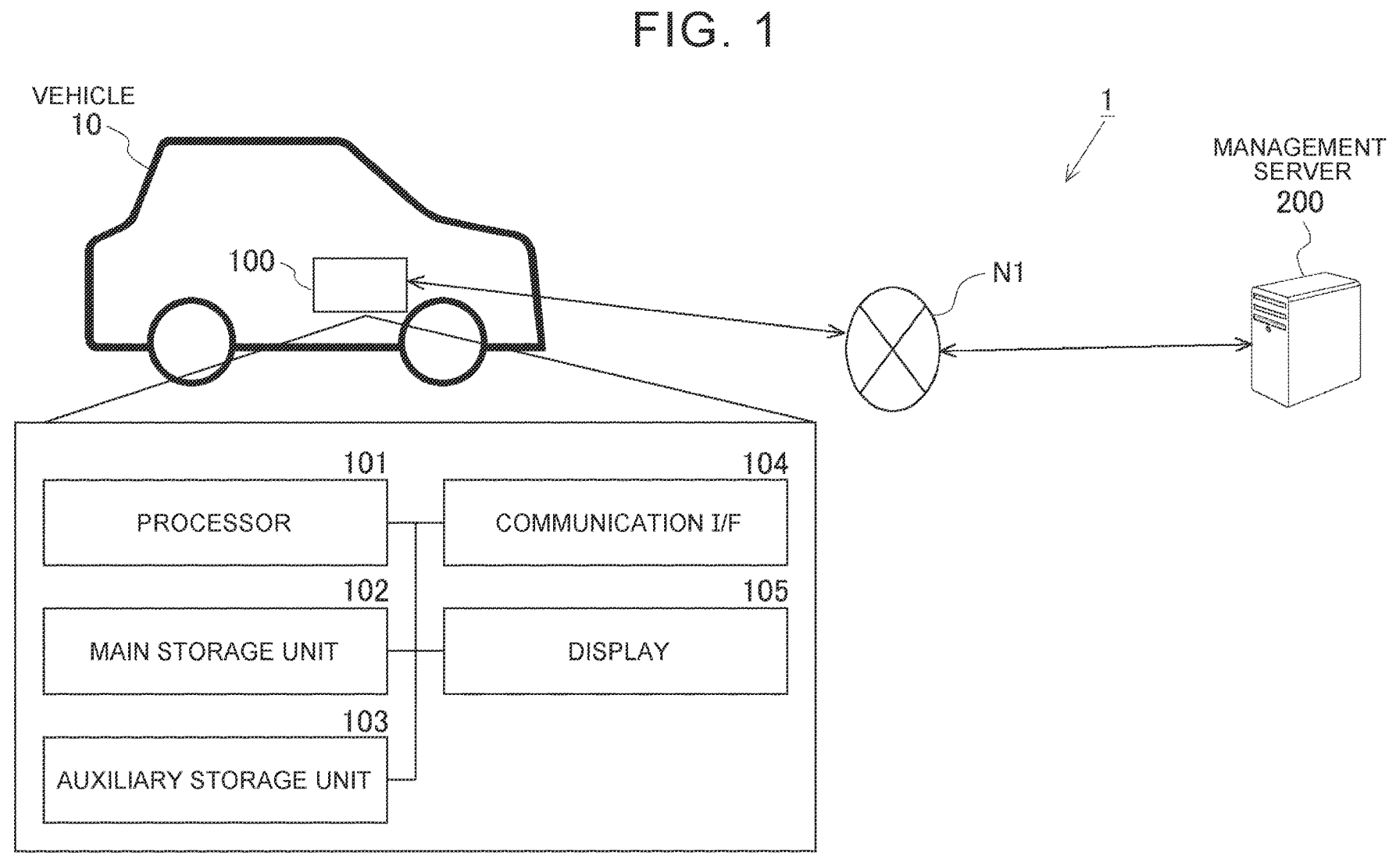

FIG. 1 is a diagram illustrating a schematic configuration of an information providing system according to the present embodiment. The information providing system according to the present embodiment is a system for providing information on a traveling route of the vehicle 10 to a driver of the vehicle 10. Here, the vehicle 10 is a vehicle capable of switching between automatic driving and manual driving. In addition, it is assumed that the road on which the vehicle 10 travels includes an autonomously drivable section and an autonomous driving disabled section.

The information providing system 1 includes an in-vehicle device 100 and a management server 200. The in-vehicle device 100 is a device mounted on the vehicle 10. The in-vehicle device 100 includes a computer. The management server 200 is a server that manages traffic information. Here, the traffic information is information about the traffic situation of the vehicle in each section of each road. The traffic information includes, for example, congestion information and speed restriction information.

In the information providing system 1, the in-vehicle device 100 and the management server 200 are connected to each other via a network N1. The network N1 may employ, for example, a Wide Area Network (WAN which is a global public communication network such as the Internet, or a telephone communication network such as a mobile telephone.

The in-vehicle device 100 includes a processor 101, a main storage unit 102, a secondary storage unit 103, and a communication interface (a communication I/F) 104 and a display 105). Here, the processor 101 is, for example, Central Processing Unit (CPU) or Digital Signal Processor (DSP). The main storage unit 102 is, for example, a Random Access Memory (RAM). The secondary storage unit 103 is, for example, Read Only Memory (ROM), Hard Disk Drive (HDD), or flash memory. Further, the auxiliary storage unit 103 may include a removable medium (portable recording medium). Here, the removable medium is, for example, a universal serial bus (USB) memory, a secure digital (SD) card, or a disc recording medium such as a compact disc read-only memory (CD-ROM), a digital versatile disc (DVD), or a Blu-ray disc.

The communication I/F 104 is an interface for connecting the in-vehicle device 100 to a network N1. The communication I/F 104 connects the in-vehicle device 100 to the network N1 using a predetermined radio communication standard such as 3rd Generation (3G) or Long Term Evolution (LTE). The communication T/F 104 includes, for example, a Local Area Network (LAN) interface board or wireless communication circuitry for wireless communication. The communication I/F 104 transmits and receives data to and from the management servers 200 via the network N1. The display 105 displays information on a traveling route of the vehicle 10 provided to the driver of the vehicle 10. The display 105 has a touch panel function. The display 105 receives an input operation by a driver (or a passenger) of the vehicle 10.

In the in-vehicle device 100 having the above-described configuration, an operating system (OS), various programs, various information tables, and the like are stored in the secondary storage unit 103. The processor 101 loads the program stored in the secondary storage unit 103 into the main storage unit 102 and executes the program. As a result, a display process for displaying information on the traveling route on the display 105 as described later is realized.

However, some or all of the functions of the in-vehicle device 100 may be realized by hardware circuitry such as an ASIC or an FPGA. Note that the in-vehicle device 100 is not necessarily realized by a single physical configuration. The in-vehicle device 100 may be configured by a plurality of computers that cooperate with each other. In the present embodiment, the in-vehicle device 100 corresponds to the "information processing device" according to the first aspect of the present disclosure. However, the "information processing device" according to the first aspect of the present disclosure does not necessarily have to be an in-vehicle apparatus.

The in-vehicle device 100 transmits route information indicating the traveling route of the vehicle 10 to the destination to the management server 200 via the network N1. When the management server 200 receives the route information from the in-vehicle device 100, the management server 200 extracts the traffic information about each section of the traveling route. Then, the management server 200 transmits the extracted traffic information for the respective sections to the in-vehicle device 100 via the network N1.

Based on the traffic information about each section of the traveling route received from the management server 200 by the in-vehicle device 100, the in-vehicle device 100 calculates the scheduled traveling time of the vehicle 10 to the destination. The scheduled traveling time to the destination is a time required for the vehicle 10 to travel on the traveling route and arrive at the destination. At this time, the in-vehicle device 100 calculates the scheduled traveling time of the vehicle 10 for each section based on the traffic information about each section of the traveling route. Then, the in-vehicle device 100 calculates the scheduled traveling time to the destination by summing the scheduled traveling time of each section.

In addition, the in-vehicle device 100 sums up the scheduled traveling times of the respective autonomously drivable sections included in the traveling route. As a result, the in-vehicle device 100 calculates the total of the times that the vehicle 10 can perform the automatic driving until the vehicle travels on the traveling route and arrives at the destination (hereinafter, may be referred to as "total automatic driving time"). Further, the in-vehicle device 100 identifies, as the first section, a section having the longest autonomous driving continuable time on the traveling route to the destination based on the scheduled traveling time of each autonomously drivable section. In the following description, the autonomous driving continuable time in the first section may be referred to as a "longest duration".

Then, the in-vehicle device 100 displays the scheduled traveling time to the destination on the display 105 as information on the traveling route. In addition, the in-vehicle device 100 displays the total automatic driving time and the longest duration on the display 105 as information on the traveling route.

Further, the in-vehicle device 100 displays the traveling route of the vehicle 10 on a map on the display 105. At this time, the in-vehicle device 100 displays, on a map indicating a traveling route, an autonomously drivable section so as to be distinguishable from a section where autonomous driving is not possible.

Functional Configuration

Next, a functional configuration of the in-vehicle device 100 will be described with reference to FIG. 2. FIG. 2 is a block diagram schematically illustrating an example of a functional configuration of the in-vehicle device 100. The in-vehicle device 100 includes a control unit 110, a communication unit 120, an input/output unit 130, and a map information database (including map information DB) 140). The control unit 110 has a function of performing arithmetic processing for controlling the in-vehicle device 100. The control unit 110 may be implemented by the processor 101.

The communication unit 120 has a function of connecting the in-vehicle device 100 to a network N1. The communication unit 120 includes a communication I/F 104. The communication unit 120 may communicate with the management server 200 through a network N1. The input/output unit 130 includes a display 11. The input/output unit 130 includes a display 11. The input/output unit 130 has a function of displaying information on a traveling route of the vehicle 10 on the display 11. The input/output unit 130 has a function of receiving information input to the display 11. The map information DB 140 stores map information to be displayed on the display 11. The map-information DB 140 is constructed in the secondary storage unit 103. The map information DB 140 stores information indicating which road is a toll road. The map information DB 140 also stores information indicating which section is an autonomously drivable section.

In the in-vehicle device 100, the control unit 110 searches for a traveling route of the vehicle 10. When the control unit 110 searches for the traveling route of the vehicle 10, first, the control unit 110 acquires the present position of the vehicle 10 detected by GPS receiver mounted on the vehicle 10. Note that the control unit 110 may acquire the departure point of the vehicle 10 input by the driver (or the passenger) instead of the current position of the vehicle 10. Further, the control unit 110 acquires the destination of the vehicle 10 input by the driver (or the passenger). Then, the control unit 110 searches the traveling route of the vehicle 10 from the current position to the destination on the basis of the acquired current position and destination of the vehicle 10 and the map information stored in the map information DB 140.

At this time, the control unit 110 searches for a plurality of traveling routes having different conditions for route selection. Examples of the route selection condition include a condition that a toll road is prioritized, a general road (a road that is not toll) is prioritized, or a condition that a travel distance to a destination is prioritized. Further, the control unit 110 generates route information indicating the plurality of searched traveling routes. Then, the control unit 110 executes a process of transmitting the generated route information to the management server 200 using the communication unit 120.

The management servers 200 have traffic information databases (traffic information DB) 210). The traffic information DB 210 stores traffic information about each section of each road. When the management server 200 receives route information indicating a plurality of traveling routes from the in-vehicle device 100, the management server 200 extracts traffic information about the respective traveling routes from the traffic information DB 210. Then, the management server 200 transmits the extracted traffic information to the in-vehicle device 100. In the in-vehicle device 100, the control unit 110 executes a process of receiving the traffic information transmitted from the management server 200 using the communication unit 120.

The control unit 110 includes an extracting unit 111, a calculation unit 112, and an identification unit 113. The extracting unit 111, the calculation unit 112, and the identification unit 113 are functional units for realizing a display process of displaying information on a traveling route of the vehicle 10 on the display 105. The extracting unit 111 extracts one or a plurality of autonomously drivable sections in each of the plurality of searched traveling routes based on the information stored in the map information DB 140. With respect to the traveling route that does not include the autonomously drivable section, the autonomously drivable section is not extracted.

The calculation unit 112 calculates the scheduled traveling time to the destination for each of the plurality of traveling routes based on the traffic information received from the management server 200. Further, the calculation unit 112 calculates the total automatic operation time for each of the plurality of traveling routes. At this time, the calculation unit 112 extracts, for each of the plurality of traveling routes, the scheduled traveling time for each of the autonomously drivable sections. Then, the calculation unit 112 calculates the total autonomous driving time by summing the scheduled traveling times of the respective autonomously drivable sections for each of the plurality of traveling routes. Further, the identification unit 113 specifies the first section and the longest duration for each of the plurality of traveling routes.

Then, the control unit 110 displays, on the display 105, the scheduled traveling time, the total automatic driving time, and the longest duration for each traveling route to the destination via the input/output unit 130. FIG. 3 is a diagram illustrating an example of the display of the scheduled traveling time to the destination, the total automatic driving time, and the longest duration for the routes 1 to 3 on the display 105.

Further, the control unit 110 displays the traveling route of the vehicle 10 on the map on the display 105 via the input/output unit 130. At this time, the control unit 110 displays, on the map, an autonomously drivable section so as to be distinguishable from a section in which autonomous driving is not possible. In addition, the control unit 110 displays the first section on the map so as to be distinguishable from other sections.

Figure 4:
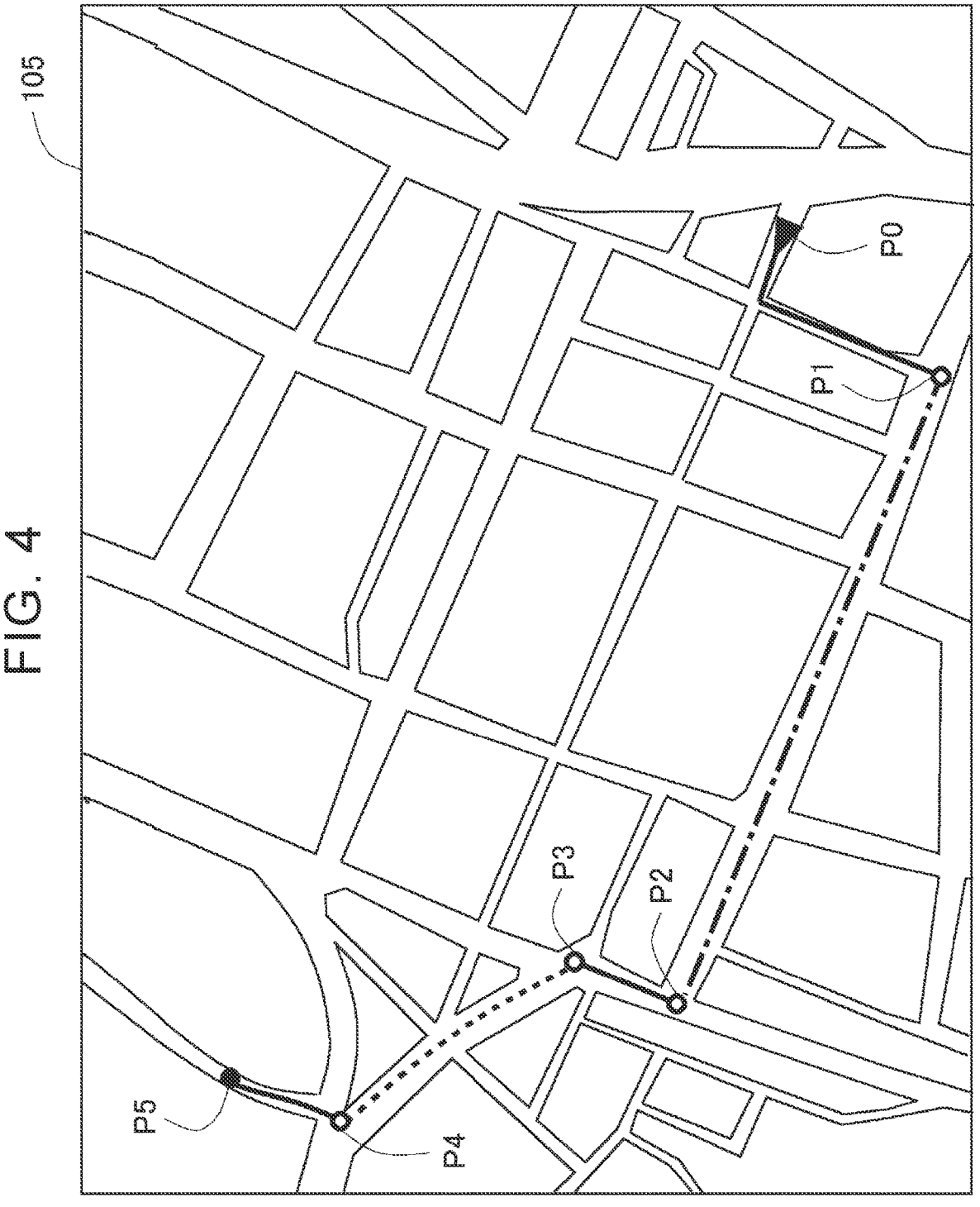
FIG. 4 is a diagram illustrating an example of a map and a traveling route displayed on a display.

FIG. 4 is a diagram illustrating an example of a map and a traveling route displayed on the display 105 when any one of the routes 1 to 3 illustrated in FIG. 3 is selected by a driver (or a passenger) of the vehicle 10. In FIG. 4, P0 represents the present position of the vehicles 10. P5 represents a destination of the vehicle 10. Also. In FIG. 4, a P4 from P1 represents a point in the middle of the traveling route of the vehicles 10. In FIG. 4, the traveling route of the vehicle 10 is represented by a solid line, a dashed-dotted line, and a broken line.

In FIG. 4, a section from P0 to P1, a section from P2 to P3, and a section from P4 to P5 are sections in which autonomous driving is not possible. Then, as shown in FIG. 4, in a section in which these automatic driving cannot be performed, the traveling route is represented by a solid line. On the other hand, in FIG. 4, a section from P1 to P2 and a section from P3 to P4 are autonomously drivable sections. The section from P1 to P2 is the first section in the traveling route shown in FIG. 4. As shown in FIG. 4, in the section from P1 to P2, which is the first section, the traveling route is represented by a dashed-dotted line. In a section from P3 to P4, which is an autonomously drivable section other than the first section, the traveling route is represented by a broken line.

When the traveling route is displayed as shown in FIG. 4, it is possible to distinguish the autonomously drivable section from the autonomous driving disabled section. Further, the first section can be distinguished from other sections. When the traveling route is displayed on the map, the autonomously drivable section may be displayed in a color different from the autonomous driving disabled section. In addition, the first section may be displayed in a different color from the other sections.

Display Process Flow

Figure 5:
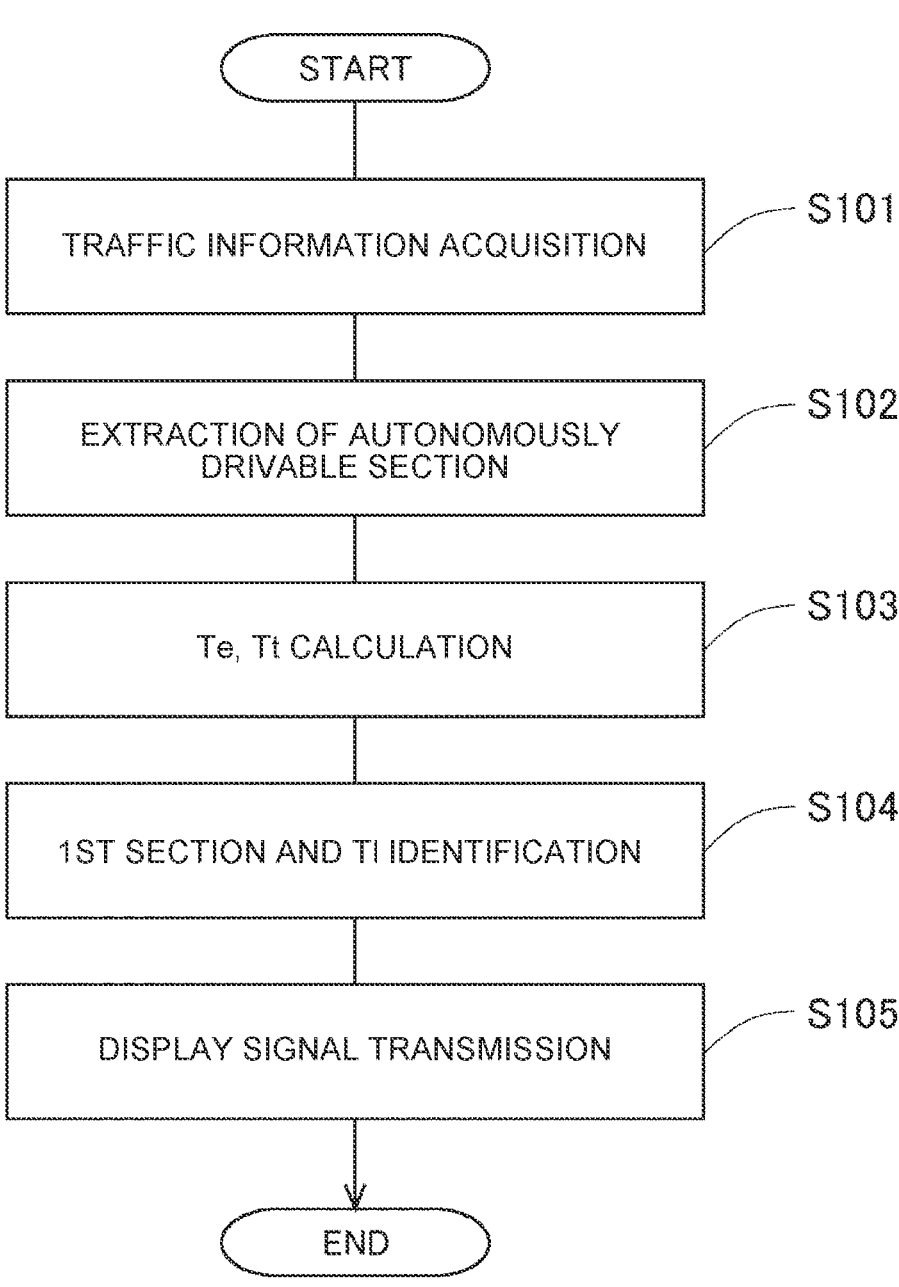
FIG. 5 is a flowchart illustrating a flowchart of a display process according to the embodiment.

Hereinafter, a flow of a display process for displaying information on a traveling route of the vehicle 10 on the display 11 according to the present embodiment will be described with reference to FIG. 5. FIG. 5 is a flowchart illustrating a flow of a display process according to the present embodiment. This flow is executed after a plurality of traveling routes is searched for by the control unit 110.

In this process, first, in S101, traffic information about the respective traveling routes received from the management servers 200 is acquired. Next, in S102, one or a plurality of autonomously drivable sections in each of the plurality of traveling routes is extracted based on the information stored in the map information DB 140. Next, in S103, the scheduled traveling time Te to the destination and the total autonomous driving time Tt are calculated for each of the plurality of traveling routes.

At this time, the scheduled traveling time for each section in each traveling route is calculated based on the traffic information. Then, the scheduled traveling time Te for one traveling route is calculated by summing the scheduled traveling times for the respective sections in one traveling route. Further, the total autonomous driving time Tt for one traveling route is calculated by summing the scheduled traveling times of the respective autonomously drivable sections in one traveling route.

Next, in S104, the first section and the longest duration T1 in the respective traveling routes are identified. Next, in S105, a display is transmitted to the display 105. The display signal is, as illustrated in FIG. 3, a signal for executing the display of the scheduled traveling time Te, the total autonomous driving time Tt, and the longest duration T1 to the destination for the respective traveling routes.

When any one of the plurality of traveling routes is selected on the display 105, a map and a display signal for causing the display of the selected traveling route as illustrated in FIG. 4 are transmitted to the display 105. In addition, the display 105 may superimpose the scheduled traveling time Te to the destination for each traveling route, the total autonomous driving time Tt, the display of the longest duration T1, and the display of each traveling route on the map.

Action and Effect

By the display processing as described above, the information on the traveling route of the vehicle 10 is output to the display 105. As a result, the driver of the vehicle 10 can grasp the longest duration of time for which manual driving is not necessary for each traveling route. As a result, the driver can select the traveling route of the vehicle 10 on the basis of the time that does not need to perform the manual driving but lasts for the longest time.

In addition, according to the display processing, the driver of the vehicle 10 can also recognize the total automatic driving time, that is, the total of times in which manual driving is not necessary for each traveling route. In the display process, a ratio of the total automatic driving time to the scheduled traveling time to the destination may be calculated for each traveling route, and the calculated ratio may be displayed on the display 105.

Further, according to the display processing, the driver of the vehicle 10 can grasp not only the time for which the manual driving is not necessary but also the position of the section for which the manual driving is not necessary on the traveling route on the map. Then, the driver can select the traveling route of the vehicle 10 based on such grasped information.

Notification Processing

Here, while the vehicle 10 is traveling on the traveling route selected by the driver of the vehicle 10, the traffic condition of the first section of the traveling route changes. With this change, the longest duration T1 may change from the time when the driver selects the traveling route. In the present embodiment, in such cases, a notification process of notifying the driver that the longest duration T1 in the first section has changed is executed.

Figure 6:
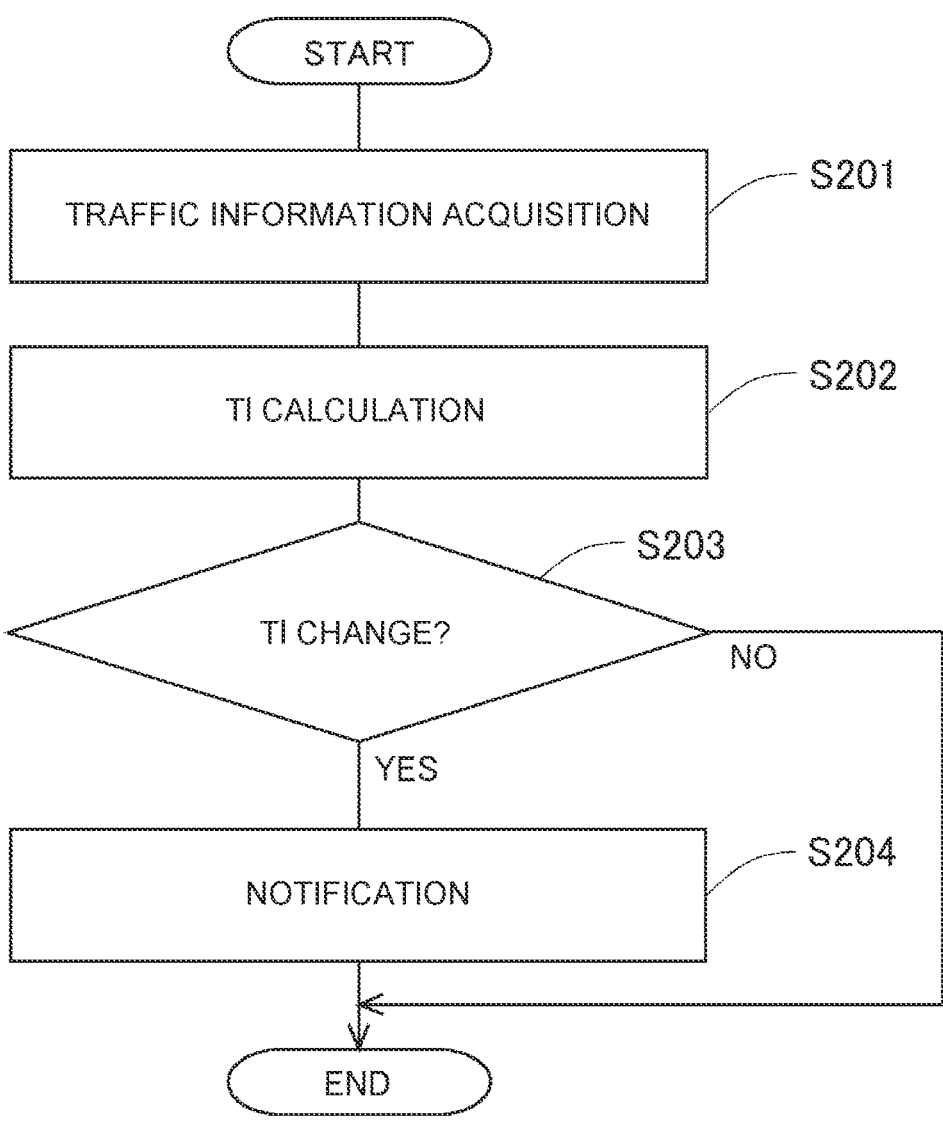
FIG. 6 is a flowchart illustrating a flow of notification processing according to the embodiment.

FIG. 6 is a flowchart illustrating a flow of notification processing according to the present embodiment. This flow is repeatedly executed by the control unit 110 while the vehicle 10 is traveling on the traveling route selected by the driver.

In this process, first, in S201, traffic data about a traveling route on which the vehicles 10 are currently traveling is acquired, which is received from the management servers 200. The traffic information acquired at this time is updated from the traffic information acquired when the driver selects the traveling route. Next, in S202, the longest duration T1 in the first section is calculated based on the traffic data acquired by S201.

Next, in S203, it is determined whether or not the longest duration T1 calculated by S202 has changed from the time when the driver selects the traveling route. In S203, an affirmative determination may be made when the variation of the longest duration T1 is larger than a predetermined threshold. If a negative determination is made in S203, the process is terminated. In this case, the notification to the driver is not executed.

On the other hand, if an affirmative determination is made in S203, then a notification to the driver is performed in S204. That is, the driver is notified that the longest duration T1 has changed from the time when the driver selects the traveling route that is currently traveling. As a notification method at this time, display on the display 105 can be exemplified. In addition, a voice notification may be executed.

By executing the notification process as described above, it is possible to recognize that the longest duration T1 on the traveling route on which the vehicle 10 is currently traveling has changed from the time when the driver selects the traveling route. Thus, for example, the driver can reselect the traveling route to the destination.

OTHER EMBODIMENTS

The above-described embodiments are merely examples, and the present disclosure may be appropriately modified and implemented without departing from the scope thereof. For example, the processes and means described in the present disclosure can be free combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to a computer by a non-transitory computer-readable storage medium connectable to a system bus of the computer. Such a computer program may be provided to a computer via a network. Non-transitory computer-readable storage media includes any type of media suitable for storing electronic instructions, such as, for example, magnetic disks (floppy disks, hard disk drives (HDD), etc.), optical disks (CD-ROM, DVD disks, Blu-ray disks, etc.), read only memories (ROM), random access memories (RAM), EPROM, EEPROM, magnetic cards, flash memories, or optical cards.

What is claimed is:

1. An information processing device comprising:
a processor that is configured to:
    extract one or more autonomously drivable sections in a traveling route of a vehicle to a destination;
    identify a first section in which an autonomous driving continuable time is longest in the traveling route; and
    output the autonomous driving continuable time in the first section;
    receive a selection of the traveling route including the first section from a driver of the vehicle; and
    notify the driver of the vehicle of a change in the autonomous driving continuable time in the first section that is more than a predetermined threshold, from a time at which the traveling route including the first section was selected as the traveling route of the vehicle, while the vehicle is traveling on the traveling route including the first section after the driver of the vehicle selected the traveling route including the first section as the traveling route of the vehicle.

2. The information processing device according to claim 1, wherein the processor is configured to output a total of an autonomously drivable time in each of the one or more autonomously drivable sections extracted.

3. The information processing device according to claim 1, wherein the processor is configured to output a ratio of a total of an autonomously drivable time in each of the one or more autonomously drivable sections extracted to a scheduled traveling time to the destination.

4. The information processing device according to claim 1, wherein the processor is configured to display the one or more autonomously drivable sections extracted on a map indicating the traveling route so as to be distinguishable from an autonomously undrivable section.

5. The information processing device according to claim 4, wherein the processor is configured to display the first section on the map indicating the traveling route so as to be distinguishable from another section.

6. The information processing device according to claim 1, wherein the processor is configured to calculate an autonomously drivable time in each of the one or more autonomously drivable sections extracted based on traffic information on each section in the traveling route.

7. The information processing device according to claim 1, wherein the processor is configured to:
    search for a plurality of the traveling routes; and
    output the autonomous driving continuable time in the first section for each traveling route of the plurality of the traveling routes.

8. A vehicle in which autonomous driving and manual driving are switchable, the vehicle comprising the information processing device according to claim 1.

9. A non-transitory storage medium storing a program that causes a computer to execute processes comprising:
    extracting one or more autonomously drivable sections in a traveling route of a vehicle to a destination;
    identifying a first section in which an autonomous driving continuable time is longest in the traveling route;
    outputting the autonomous driving continuable time in the first section;
    receiving a selection of the traveling route including the first section from a driver of the vehicle; and
    notifying the driver of the vehicle of a change in the autonomous driving continuable time in the first section that is more than a predetermined threshold, from a time at which the traveling route including the first section was selected as the traveling route of the vehicle, while the vehicle is traveling on the traveling route including the first section after the driver of the vehicle selected the traveling route including the first section as the traveling route of the vehicle.

* * * * *